United States Patent [19]

Takano

[11] Patent Number: 5,543,930
[45] Date of Patent: Aug. 6, 1996

[54] VIDEO DATA MANAGEMENT METHOD AND APPARATUS

[75] Inventor: Hajime Takano, Tokyo, Japan

[73] Assignee: NEC Corporation, Tokyo, Japan

[21] Appl. No.: 197,828

[22] Filed: Feb. 17, 1994

[30] Foreign Application Priority Data

Feb. 18, 1993 [JP] Japan ................................. 5-028346

[51] Int. Cl.⁶ ................................................. H06N 5/917
[52] U.S. Cl. ...................... 358/335; 358/311; 360/14.1; 360/14.3
[58] Field of Search ................................. 358/335, 311; 360/14.1, 14.3; H04N 5/917

[56] References Cited

U.S. PATENT DOCUMENTS

| | | | |
|---|---|---|---|
| 4,893,198 | 1/1990 | Little | 358/311 |
| 5,012,334 | 4/1991 | Etra | 358/311 |
| 5,126,851 | 6/1992 | Yoshimura | 358/335 |

OTHER PUBLICATIONS

Mackay, W. E. et al., "Virtual Video Editing in Interactive Multimedia Applications", *Communications of the ACM*, vol. 32:7, pp. 802–810 (Jul. 1989).

*Primary Examiner*—Howard W. Britton
*Attorney, Agent, or Firm*—Foley & Lardner

[57] ABSTRACT

Virtual data having a reference section to indicate reference data and a constraint section to indicate the manner in which the reference data are to be processed are held as video data. Decision means decides whether or not the video data read out from accumulating means are virtual data. If the video data are not virtual data, unprocessed video data are supplied. If the video data are virtual data, calculating means is actuated. The calculating means processes the reference data as indicated by the constraint section of the virtual data. As a result of the processing, index data are obtained. These index data are supplied as video data.

5 Claims, 17 Drawing Sheets

$dfk = fke - fks + 1$

VIDEO DATA MANAGEMENT METHOD AND APPARATUS

BACKGROUND OF THE INVENTION

The present invention relates to a management method for video data, which are data to be used in the computer handling of pictures recorded in recording apparatuses such as video taperecorders, and to a video data management apparatus using this video data management method.

To begin with, the terms used in this specification will be defined.

A frame means a still picture.

A video source is pictures themselves recorded on a video tape or video disk, or in an optical disk apparatus or a hard disk apparatus or the like. A video source consists of a set of frames.

Video data are data designating useful parts of a video source. For instance, they designate the parts to be cut out when editing a video source. Video data are also used for specifying the positions and configurations of objects which are to appear in a frame.

Application data result from the editing and modification of a video source as indicated by video data. Application data are usually referred to as video data. Thus the term "video data" can be used in two different senses. In this specification, in order to make the meaning of "video data" unmistakable, an edited video source will be referred to as application data.

Index data are a sort of video data. They designate a range in a video source. Typical index data are a pair of a start frame number and an end frame number. Frames from one designated by a start frame number and another designated by an end frame number constitute the range designated by index frame.

Next will be described the pertinent prior art.

One example of conventional video data management method is disclosed in a paper by Wendy E. Mackay and Glorianna Davenport entitled "Virtual Video Editing in Interactive Multimedia Applications", published in Communications of the ACM, July 1989, vol. 32, No. 7, pp. 802–810. Lines 16 to 21 of the right column, page 802, of this paper constitute a statement to the effect that data corresponding to a start frame number and an end frame number are accumulated as video data. Thus, according to the method described in this paper, index data for editing a video source into application are stored for all application data.

This video data management method according to the prior art involves the problem that an enormous volume of video data has to be accumulated. This problem is explained by way of an example.

Suppose that, application data "A" is composed of some parts of a video source joined together, and application data "B" is composed of some parts of application data "A". In this case, most parts of application data "B" overlap video data of application data "A". However, by the aforementioned method according to the prior art, video data for application data "A" and video data for application data "B" are separately accumulated, resulting in a tremendous volume of video data that have to be accumulated.

SUMMARY OF THE INVENTION

An object of the present invention is to provide a method and an apparatus for video data management which permit a reduction in the volume of video data to be accumulated. To achieve this object, the video data management method according to the invention uses a new kind of data called virtual data. Virtual data consist of reference data indicating the data to be referred to and constraints on the processing of the reference data. The volume of virtual data themselves is very small. When a video source is to be edited on the basis of virtual data, the reference data are processed under the constraints to prepare index data.

More specifically, the video data management method according to the invention comprises, where virtual data having a reference section for indicating the data to be referred to and a constraint section indicating the manner in which the reference data are to be processed are held as video data, a first step to read out designated video data; a second step to obtain index data, when the video data read out are virtual data, by processing the reference data as indicated by the constraint section; and a third step to supply the index data as video data.

Furthermore, a video data management apparatus according to the invention comprises an accumulating section for accumulating video data; read means for reading out first video data from the accumulating section; decision means for deciding whether or not said first video data read out by said read means are virtual data, and supplying the first video data when said first video data are not virtual data; and calculating means, actuated when the first video data are determined by the decision means not to be virtual data, for reading out reference data indicated by the reference section of said first video data from the accumulating section, reading out constraints indicated by the constraint section of the first video data from said accumulating section, calculating index data by processing the reference data under the constraints, and supplying the index data as video data.

BRIEF DESCRIPTION OF THE DRAWINGS

Other features, functions and advantages of the present invention will become more apparent from the following detailed description when taken in conjunction with the accompanying drawings in which.

In the figures, the same reference numerals denote respectively the same constituent elements.

DETAILED DESCRIPTION OF THE PREFERRED EMBODIMENTS

First will be explained the terms used in the following description with reference to drawings.

Figure 1:
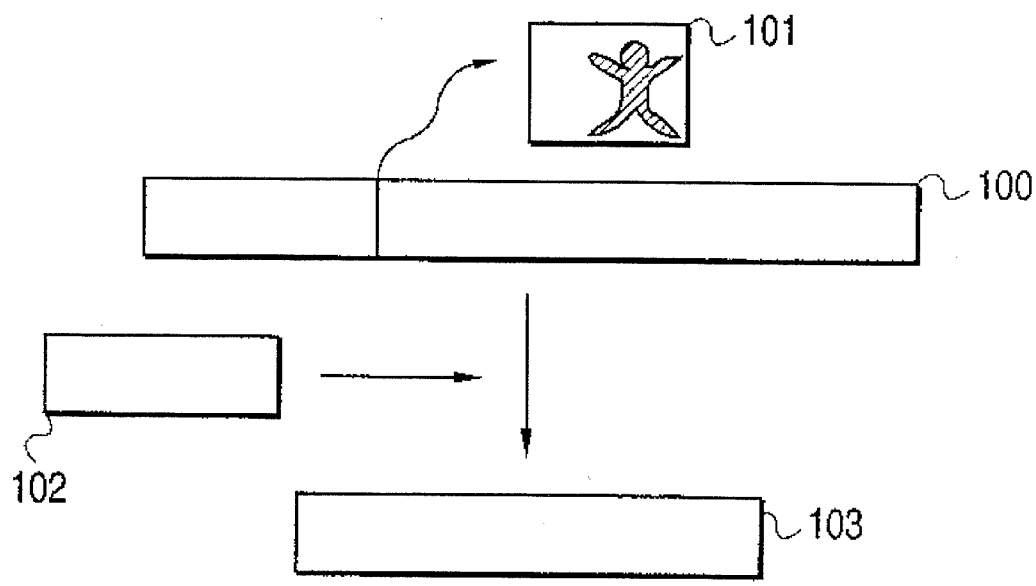
FIG. 1 is a diagram illustrating the relations among the video source 100, frame 101, video data 102, and application data 103.

Referring to FIG. 1, a video source 100 consists of a large number of frames 101. The video source 100 is edited and modified in accordance with video data 102 into application data 103. The application data 103 are delivered to application software. The video source cannot be used by the application software until it is processed into the application data 103.

Next will be defined the terms "absolute frame number" and "relative frame number".

Figure 2:
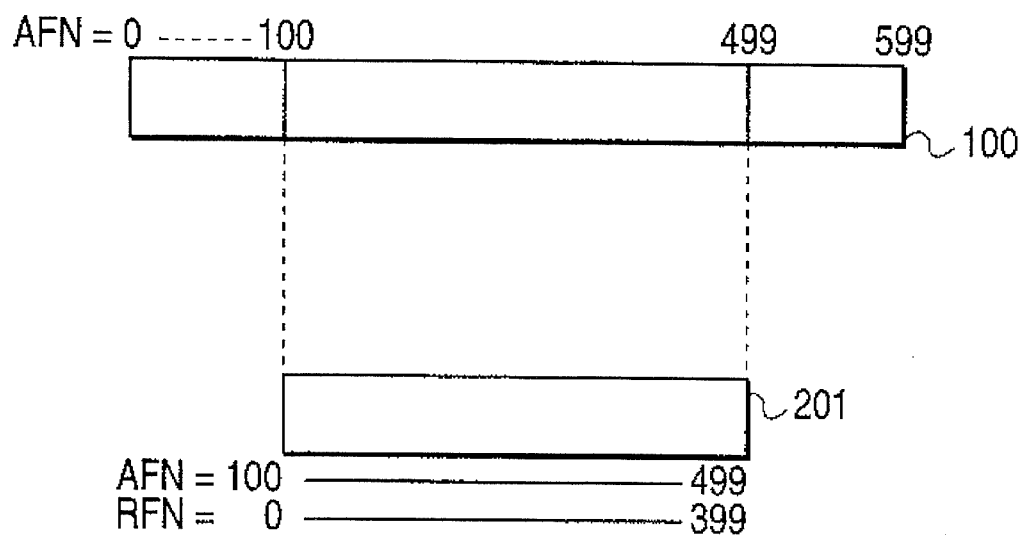
FIG. 2 is a diagram for explaining what the absolute frame numbers and relative frame numbers are.

Referring to FIG. 2, each frame in the video source 100 is assigned a reference number. This number is the frame number in, for instance, a video disk apparatus. Frame numbers in the video source are called absolute frame numbers, abbreviated hereinafter to AFN's. The video source 100 of FIG. 2 consists of 600 frames of 0 through 599 in AFN.

It is possible to compose another set of data by taking out a part of a video source. Data 201 in FIG. 2 comprise data of 100 through 499 in AFN in the video source 100. It is also possible to assign new frame numbers to frames constituting the data 201. In the data 201 of FIG. 2, the frames of 100 through 499 are newly assigned reference numbers 0 through 399. These non-AFN numbers assigned to frames are called relative frame numbers, abbreviated hereinafter to RFN's.

Next will be defined the term "cut".

Figure 3:
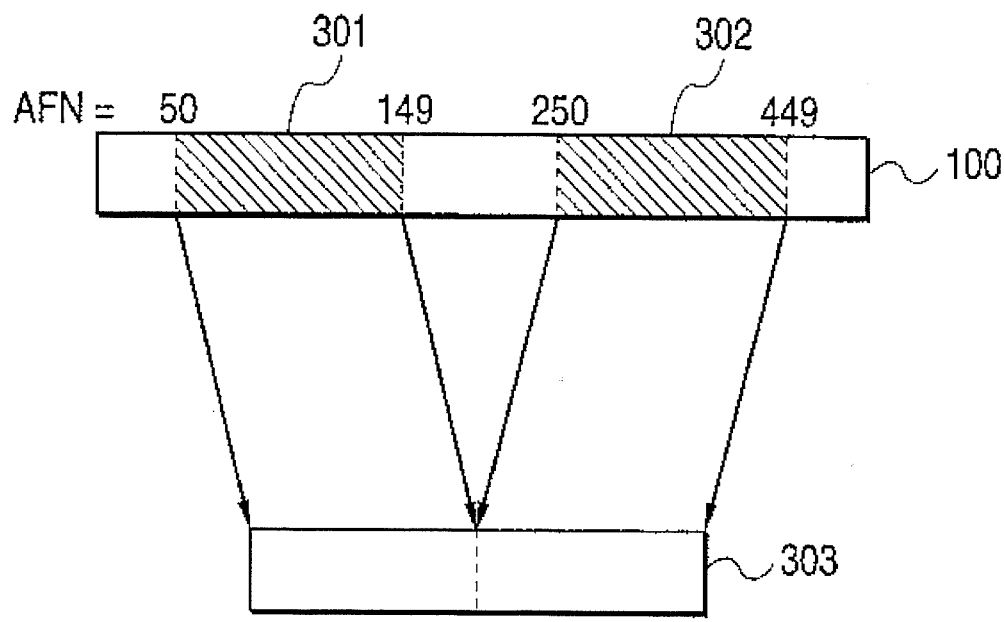
FIG. 3 illustrates a cut.

Referring to FIG. 3 data 303 consist of frames of 50 through 149 and 250 through 449 in AFN in the video source 100. A set of consecutive frames, such as the frames of 50 through 149 in AFN in the video source 100 is called a cut. Thus the data 303 consist of a cut 301 and another cut 302.

A cut can be identified by its start frame number and end frame number, respectively abbreviated hereinafter to SFN and EFN. A pair of SFN and EFN is called scene data.

Next will be defined the term "object data". In this specification are used two kinds of object data, type 1 and type 2.

Figure 4:
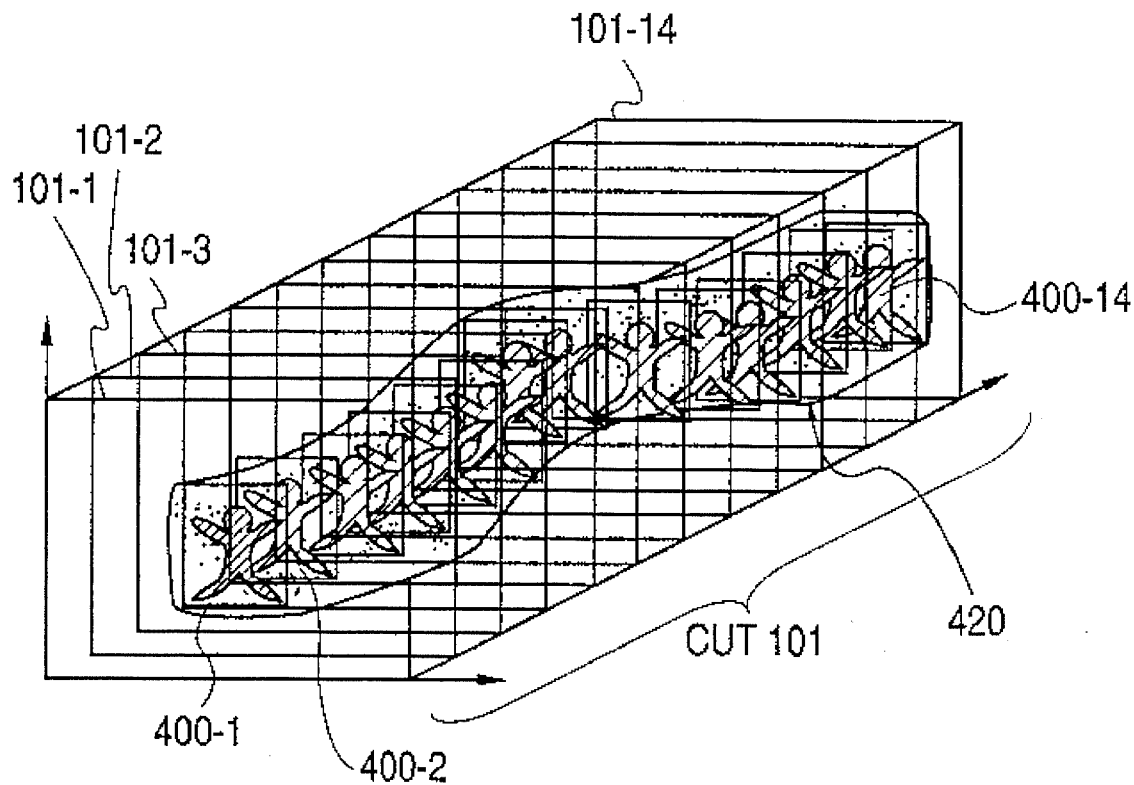
FIG. 4 illustrates the sequence of the objects 400-1~400-14 appearing in the frame 101-1~101-14 and the object data 401.

Referring to FIG. 4, cut 101 consists of frame 101-1~101-14. Objects 400-1~400-14 appear in the frames 101-1~101-14 respectively. The objects 400-1~400-14 in FIG. 4 are a human. The position and configuration of the objects 400-1~400-14 vary from frame to frame.

Figure 5:
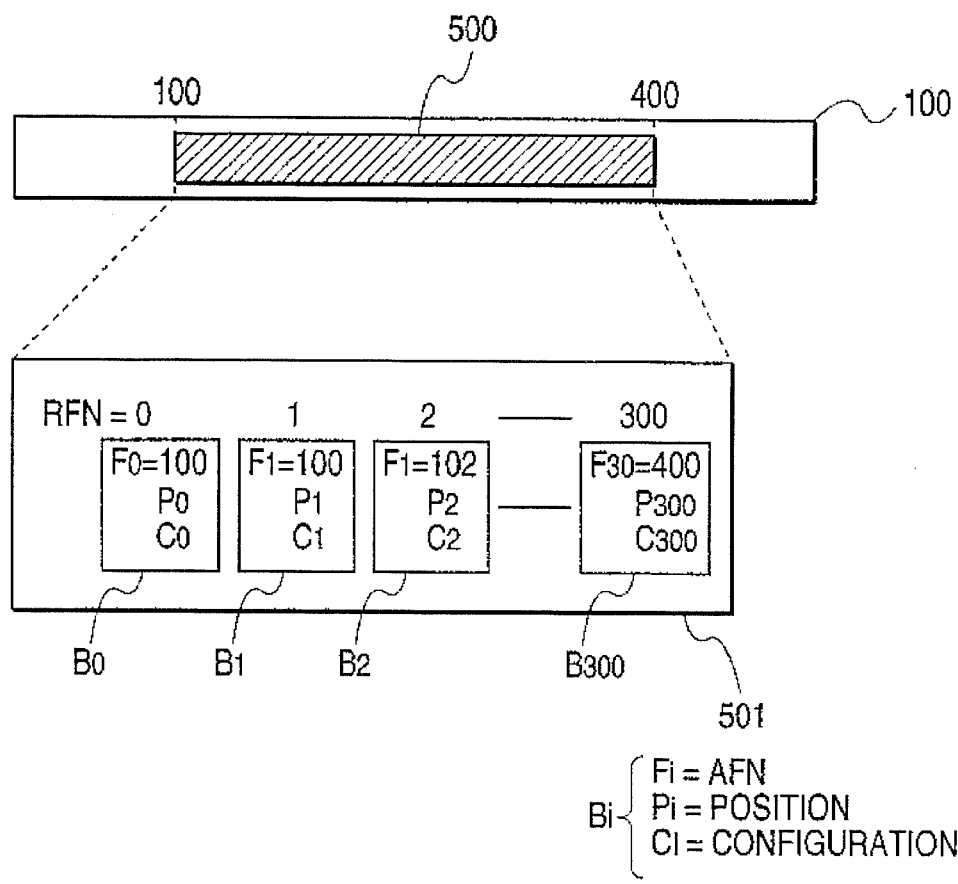
FIG. 5 is a diagram for explaining object data of type 1.

Referring now to FIG. 5, the object has appeared in the frames of 100 through 400 in AFN, represented by 500 in the video data 100. Object data 501 are data indicating the position and configuration of this object. The object data 501 consist of data B0 through B300. The data B0 through B300 respectively corresponding to the frames of 100 through 400 in AFN.

Bi consists of Fi in AFN, the position Pi of the object in the corresponding frame, and the configuration Ci of the object. For instance in B0, F0 is 100 because B0 corresponds to the frame of 100 in AFN, and the position and configuration of the object in the frame of 100 in AFN are P0 and C0, respectively.

The object data 501 have data to specify the position P and the configuration C of the object for every frame in which each object emerges. Such object data are called object data of type 1.

Next will be defined object data of type 2.

Figure 6:
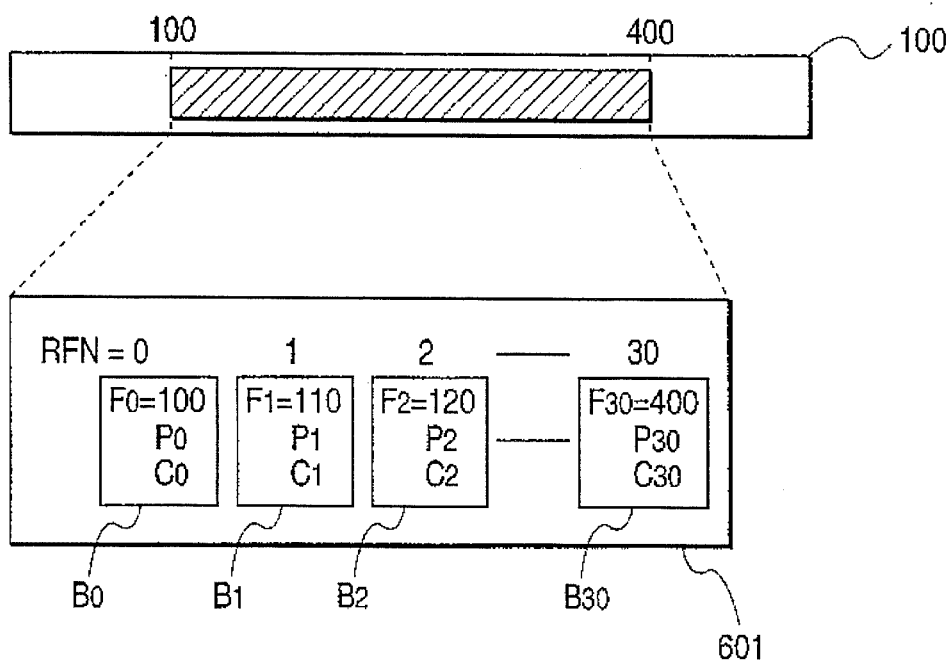
FIG. 6 is a diagram for explaining object data of type 2.

Referring to FIG. 6, object data 601 consist of 31 data from B0 through B30. The data B0 through B30 respectively correspond to the frames of 100, 110, 120, . . . 400 in AFN. Thus the object data 601 hold the position and configuration of the object at a rate of one to every 10 frames. The position and configuration of the object in a frame not held in the object data 601 are figured out from the values of the data B0 through B30 by interpolation. Object data of which the volume of data to be held are reduced by using interpolation, such as the object data 601, are called object data of type 2.

Next will be explained the relations among the various data referred to above.

Figure 7:
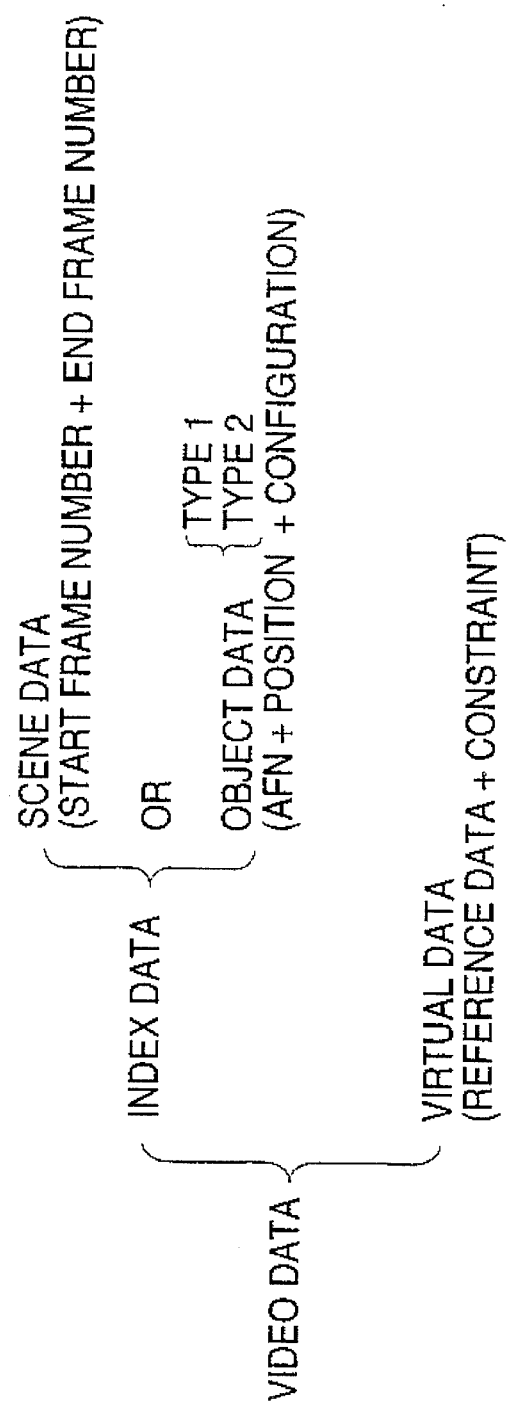
FIG. 7 is a diagram for explaining the relations among various types of data.

Referring to FIG. 7, the video data are either index data or virtual data. The virtual data are a new form of data introduced by the present invention. By using the virtual data, the volume of video data to be accumulated can be reduced.

The index data are either scene data or object data.

The object data are either object data of type 1 or object data of type 2.

(Virtual data)

Figure 8:
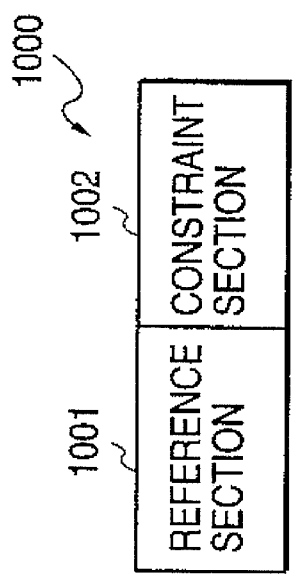
FIG. 8 illustrates the structure of the virtual data 1000.

Referring to FIG. 8, virtual data 1000 consist of a reference section 1001 and a constraint section 1002.

Information stored in the reference section 1001 indicates other video data to be referred to. The video data to be referred to will be called "reference data", which may be virtual data and may be a plurality of sets of data.

Information stored in the constraint section 1002 indicates the method to modify the reference data. This information will be called "constraints". Index data can be calculated by modifying the reference data 1001 in accordance with the constraint data 1002.

First Preferred Embodiment (Hardware configuration)

Next will be described the first preferred embodiment of the present invention with reference to drawings.

Figure 9:
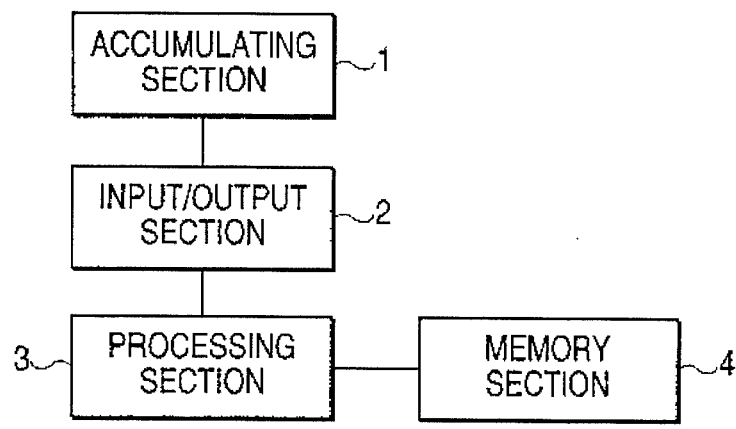
FIG. 9 is a block diagram illustrating the structure of a video data management apparatus, which is the first preferred embodiment of the invention.

Referring to FIG. 9, a video data management apparatus according to the invention comprises an accumulating section 1, an input/output (I/O) section 2, a processing section 3, and a memory section 4.

In the accumulating section 1 are accumulated video data. The accumulating section 1 is a memory unit, such as a hard disk unit or a semiconductor memory.

The I/O section 2, which is a usual I/O circuit, controls the moves of data between the accumulating section 1 and the processing section 3.

The processing section 3 is a usual central processing unit (CPU).

The memory section 4, which is a memory unit permitting both read and write, such as a semiconductor memory, temporarily stores necessary data for processing by the processing section 3.

(Configuration of means)

Figure 10:
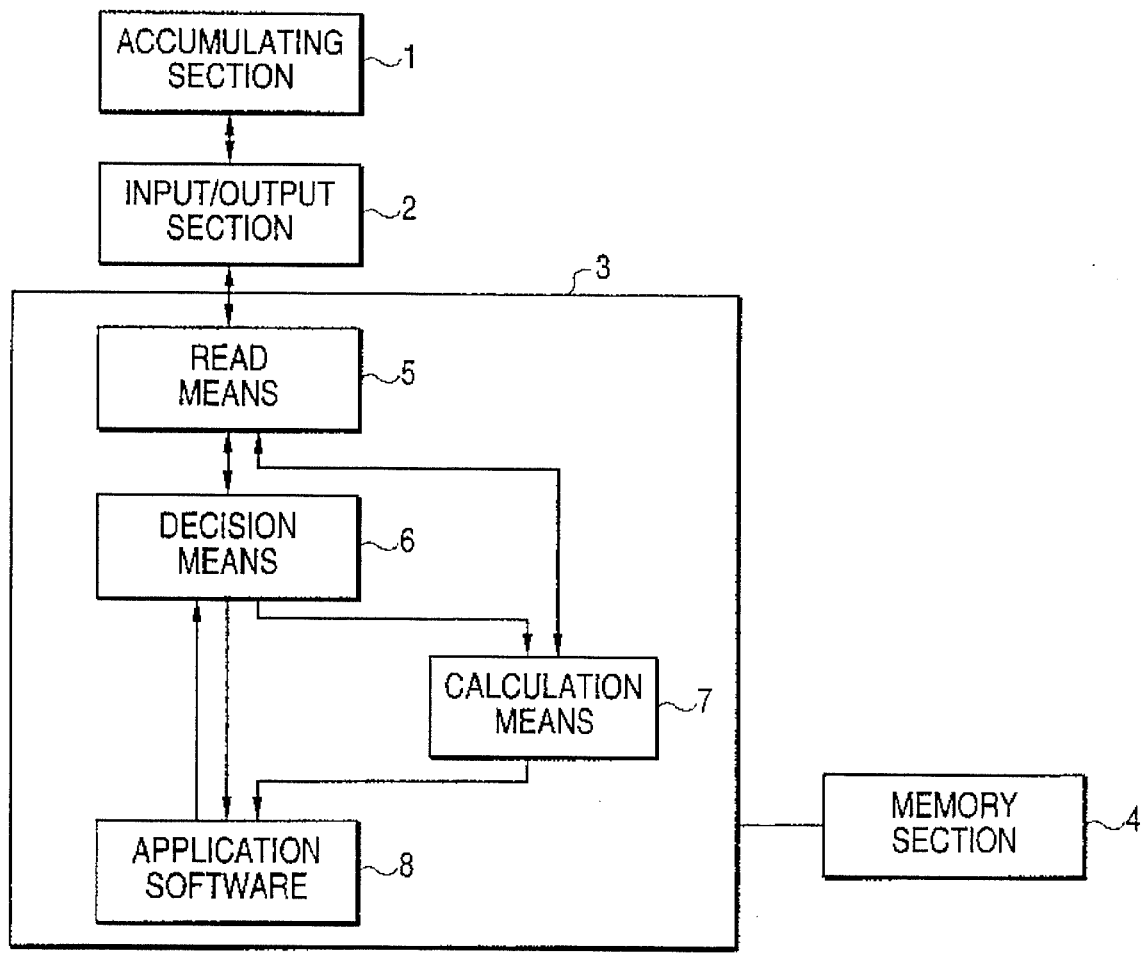
FIG. 10 is a block diagram further illustrating the structure of a video data management apparatus, which is the first preferred embodiment of the invention.

Referring to FIG. 10, said processing section 3 executes the functions of read means 5, decision means 6 and calculation means 7. These means are programs executed by the processing section 3.

The read means 5 has a function to read out of the accumulating section 1 video data indicated by the decision means 6.

The decision means 6 has the following four functions. First the decision means 6 has a function to read video data indicated by application software 8 out of the accumulating section 1 via the read means 5. Second, it has a function to decide whether or not the video data which have been read out are virtual data. Third, it has a function to send out the video data read out, if they are virtual data, to the calculation means 7. Fourth, it has a function to send out the video data read out, if they are not virtual data, i.e. if they are index data, to the application software 8.

The calculation means receive virtual data from the decision mdans 6, and calculate index data on the basis of the virtual data. The index data are obtained by modifying the reference data indicated by the reference section by a method indicated by the constraint section.

Next will be described the operations of the afore-mentioned decision means 6 and calculation means 7.

(Operation of the decision means 6)

Figure 11:
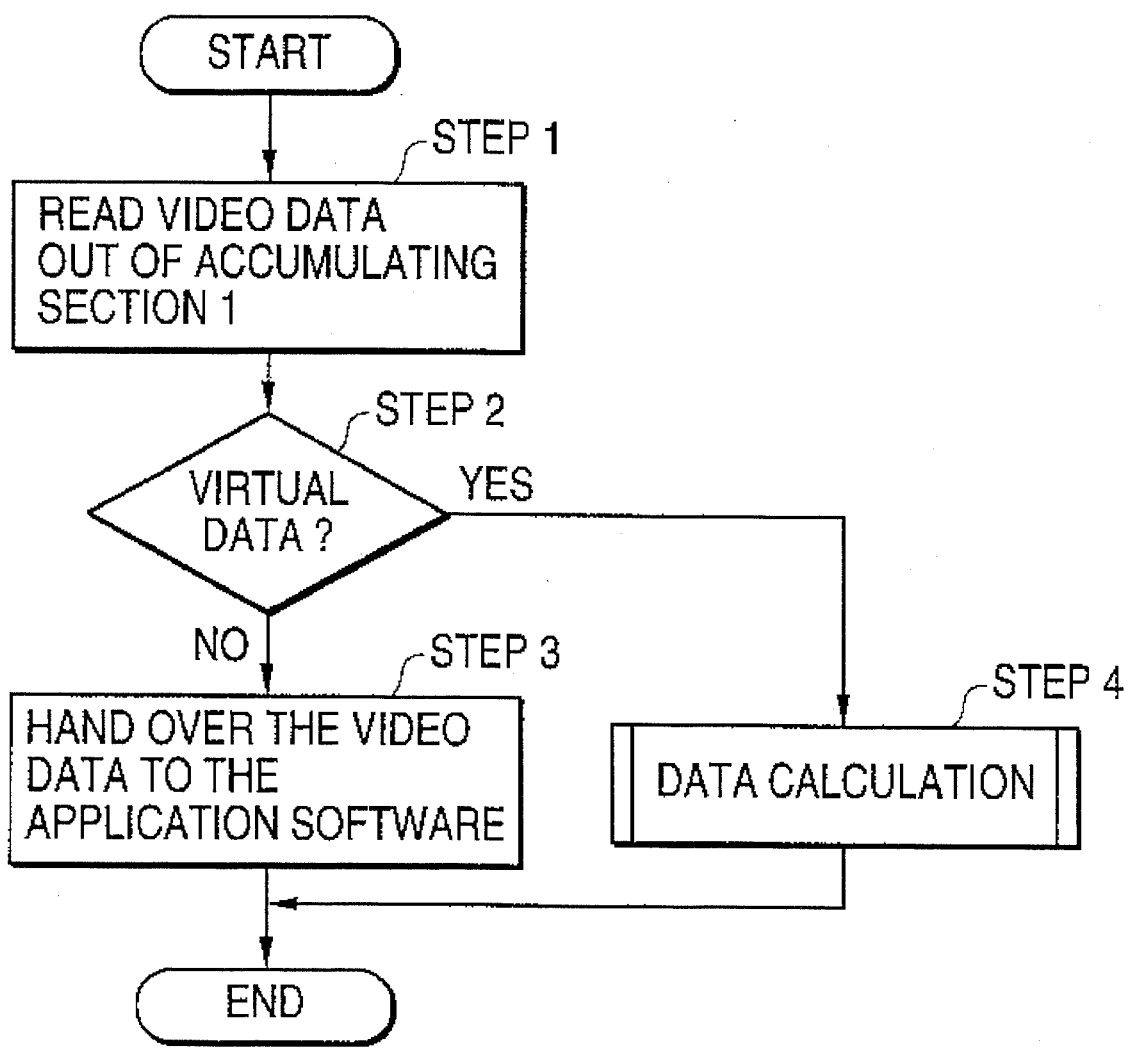
FIG. 11 is a flow chart showing the operation of the processing section 3.

Referring to FIG. 11, at step 1, the decision means 6 reads video data out of the accumulating section 1. The video data to be read out are indicated by the application software 8.

At step 2, the decision means 6 decides whether or not the video data which have been read out are virtual data. If the data read out are not virtual data, i.e. if they are index data, step 3 is executed. If the video data are virtual data, step 4 is executed.

At step 3, the decision means 6 hands over the video data read out at step 1 to the application software as they are.

At step 4, the decision means 6 actuates the calculation means 7. The video data read out at step 1 are delivered to the calculation means 7. The video data delivered to the calculation means 7 will be hereinafter referred to as virtual data a. The subsequent procedure of step 4 is executed by the calculation means 7. The operations at step 4 will be described in detail below.

(Operations of the calculating means 7 at step 4)

Figure 12:
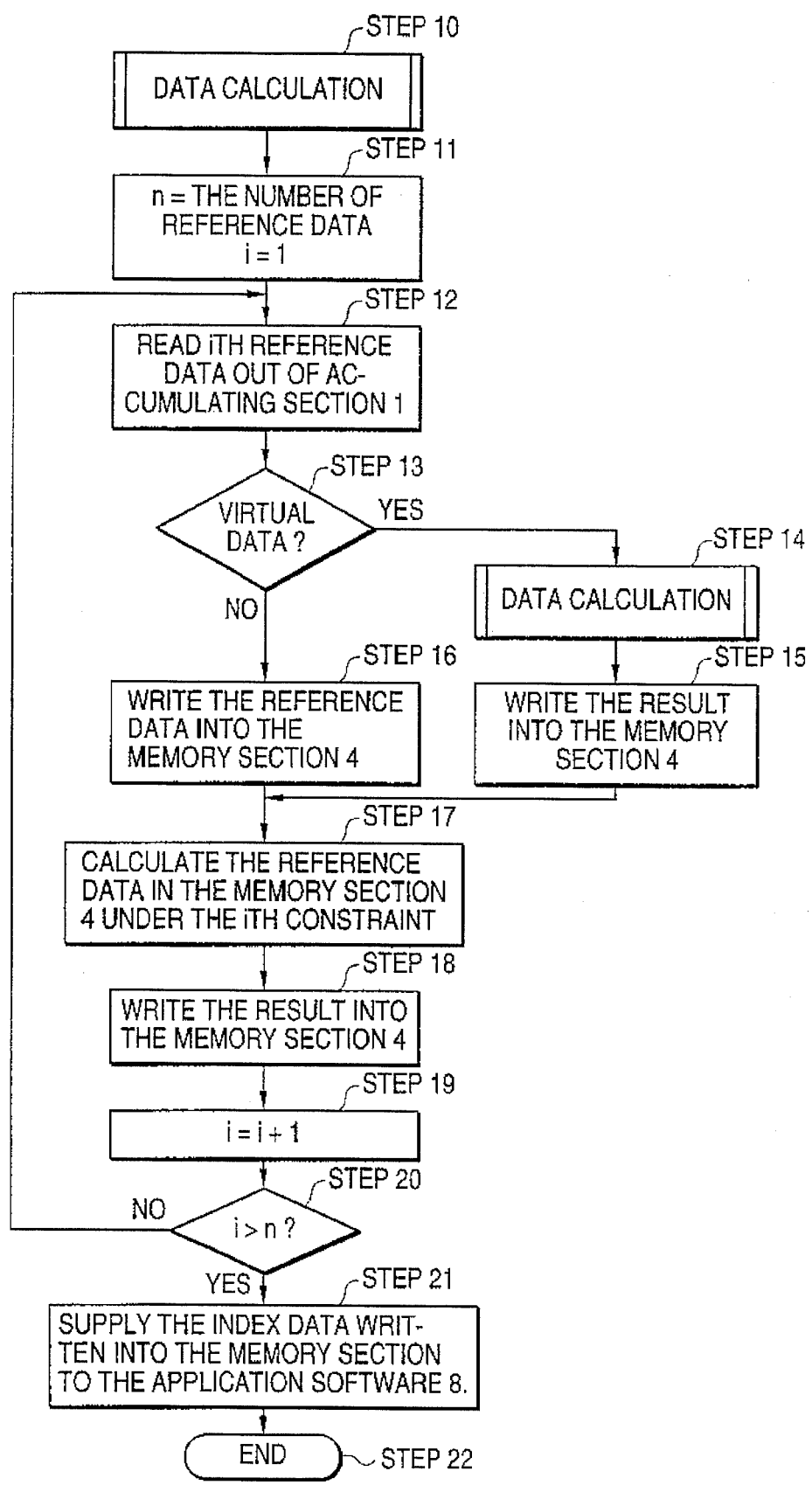
FIG. 12 is a flow chart showing details of step 4 in FIG. 11.

Referring to FIG. 12, at step 11, the calculating means 7 sets the values of variables n and i. The number of reference data to be referred to by the virtual data a is set as the variable n. Integer 1 is set as the variable i.

At step 12, the ith set of reference data are read out of the accumulating section 1 via the input means 5. These reference data will be hereinafter referred to as reference data b.

At step 13, the decision means 6 decides whether or not the reference data b are virtual data. If the reference data b are determined to be virtual data, step 14 is executed. If the reference data b are determined not to be virtual data, step 16 is executed.

At step 14, the decision means 6 calls itself. Thus, there is performed a recursive procedure. At this time, the reference data b are handed over as virtual data. The recursive execution of step 14 makes it possible to calculate index data even if the virtual data a refer to virtual data in a multiple way.

At step 15, the result obtained by step 14 is written into the memory section 4.

At step 16, if the reference data b were determined not to be virtual data by the decision means 6 at step 13, the reference data b are written into the memory section 4.

At step 17, the reference data b written into the memory section 4 are calculated under the ith constraint of the virtual data a. The calculation gives index data, which will be hereinafter referred to as index data c. Specific processing at step 17 differs with the reference data and the type of constraints to be used. An example of specific processing at step 17 will be described in detail below.

At step 18, the index data c are written into the memory section 4.

At step 19, 1 is added to i.

At step 20, the magnitudes of i and n are compared. If i is smaller than n, step 12 is executed again. If i is not smaller than n, step 21 is executed.

At step 21, the index data written into the memory section 4 at steps 11 through 20 are supplied to the application software 8. Completion of step 21 ends the operations of the calculating means 7.

(Details of step 17)

Next will be described the details of step 17.

The operations executed at step 17 differ with the types of reference data and constraint data. With respect to this embodiment, a case in which both the reference data and the constraint data are scene data will be described, where the reference data consist of a plurality of sets of scene data.

Next will be described the situation to which this embodiment is applicable.

Figure 13:
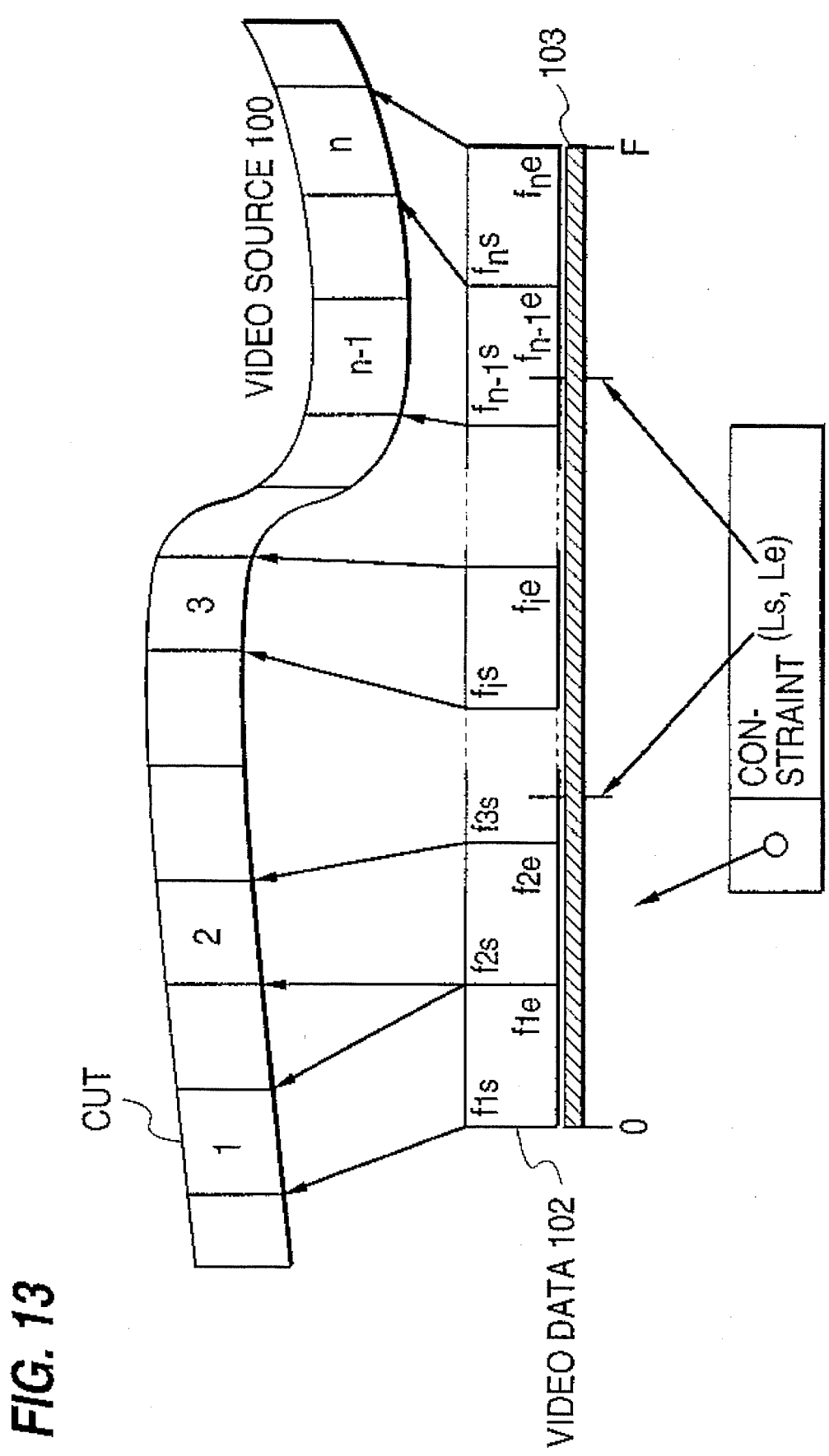
FIG. 13 is a diagram illustrating the relations among the video source 100, video data 102 and application data 103.

Referring to FIG. 13, application data 103 consist of cuts 1 through n in the video source 100. Each frame in the application data 103 is assigned one of relative frame numbers 0 through F. The video data 102 for editing the application data 103 consist of n scene data. The start frame number and the end frame number of a cut i will be hereinafter represented by fis and fie, respectively, both of which are absolute frame numbers.

Figure 14:
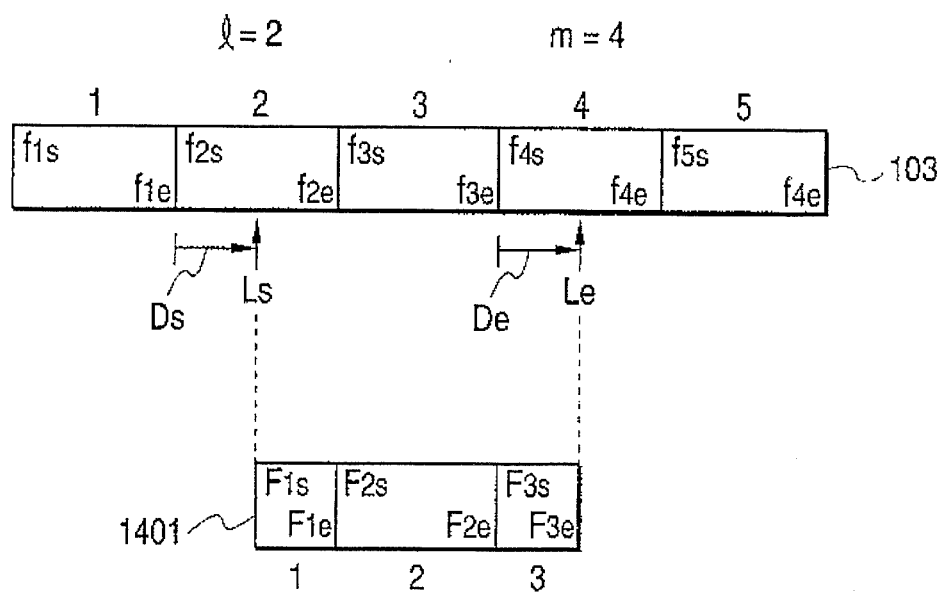
FIG. 14 is a diagram illustrating the relation between the application data 103 and application data 1401.

Referring to FIG. 14, a case is supposed in which a cut specified by scene data (Ls - Le) is taken, out of the application data 103 and new application data 1401 are edited. Ls and Le are given by their respective relative frame numbers in the application data 103. In the situation illustrated by FIG. 14, the application data 1401 consist of three cuts. The absolute start frame number and absolute end frame number of the ith of the cuts constituting the application data 1401 will be hereinafter represented by Fis and Fie, respectively.

In this embodiment, in the above-described situation, the video data for editing the application data 1401 are composed of virtual data. In this case, the video data 102 of the application data 103 and the scene data (Ls - Le) are used as reference data and constraints, respectively. Thus in this embodiment, the reference data and constraints consist of scene data, and the index data to be calculated therefrom are scene data, too.

(Specific processing at step 17)

Next will be described specific processing at step 17 in the case where the reference data and constraints are scene data.

Figure 15:
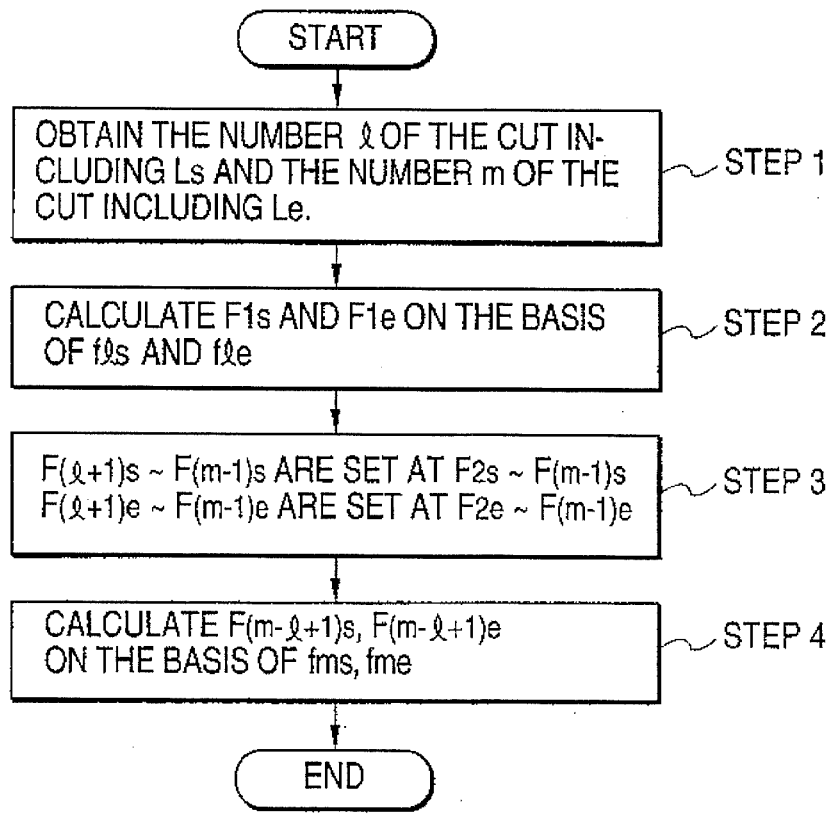
FIG. 15 is a flow chart showing the principle of processing at step 17 of FIG. 12.

Referring to FIG. 15, step 17 can be composed of four steps as a matter of principle.

At step 1, out of the cuts 1 through n constituting the application data 103, the number l of the cut including the frame whose LFN is Ls and the number m of the cut including the frame whose LFN is Le are obtained.

At step 2, on the basis of fls and fle, Fls and Fle are calculated. Referring again to FIG. 14, in the case of FIG. 14, Fls equals f2s plus Ds and Fle equals f2e.

At step 3, f(l+1)s through f(m−1)s are set at F2s through F(m−1)s, respectively, and f(l+1)e through f(m−1)e are set at F2e through F(m−1)e, respectively.

At step 4, on the basis of fms and fme, F(m−l+1)s and F(m−l+1)e are calculated. Referring again to FIG. 14, in the case of FIG. 14, F(m−l+1)s equals f4s and F(m−l+1)e equals f4s plus De. In practice, besides steps 1 through 4, exceptional processing is needed for the case in which the frame of LFN=Ls and that of LFN=Le are identical. This exceptional processing is not shown in FIG. 15.

Figure 16:
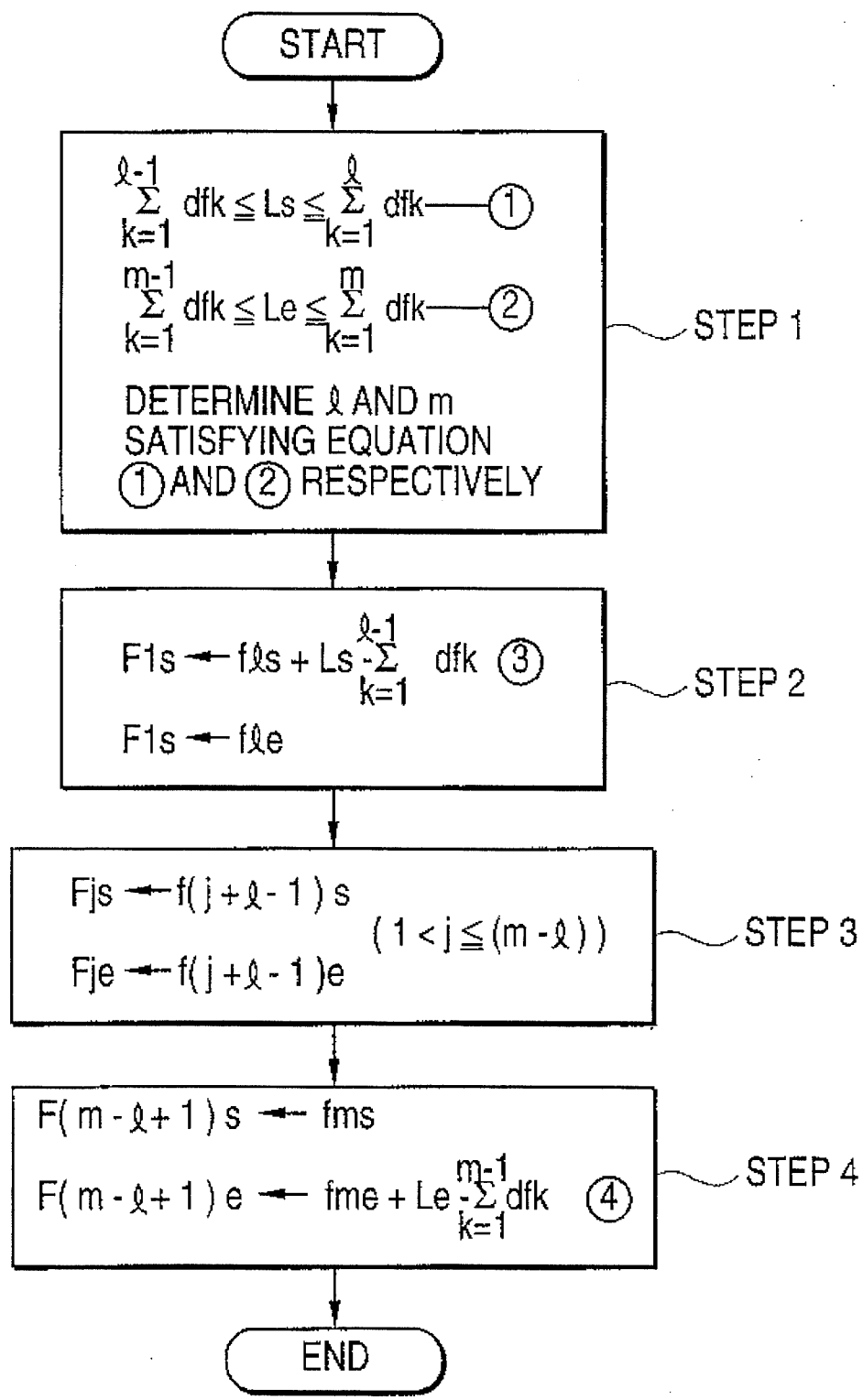
FIG. 16 is a flow chart, which is a mathematical version of the flow chart of FIG. 15.

FIG. 16 shows the procedures at steps 1 through 4 in FIG. 15 in a mathematical expression. The aforementioned exceptional processing is not shown in FIG. 16 either.

Figure 17:
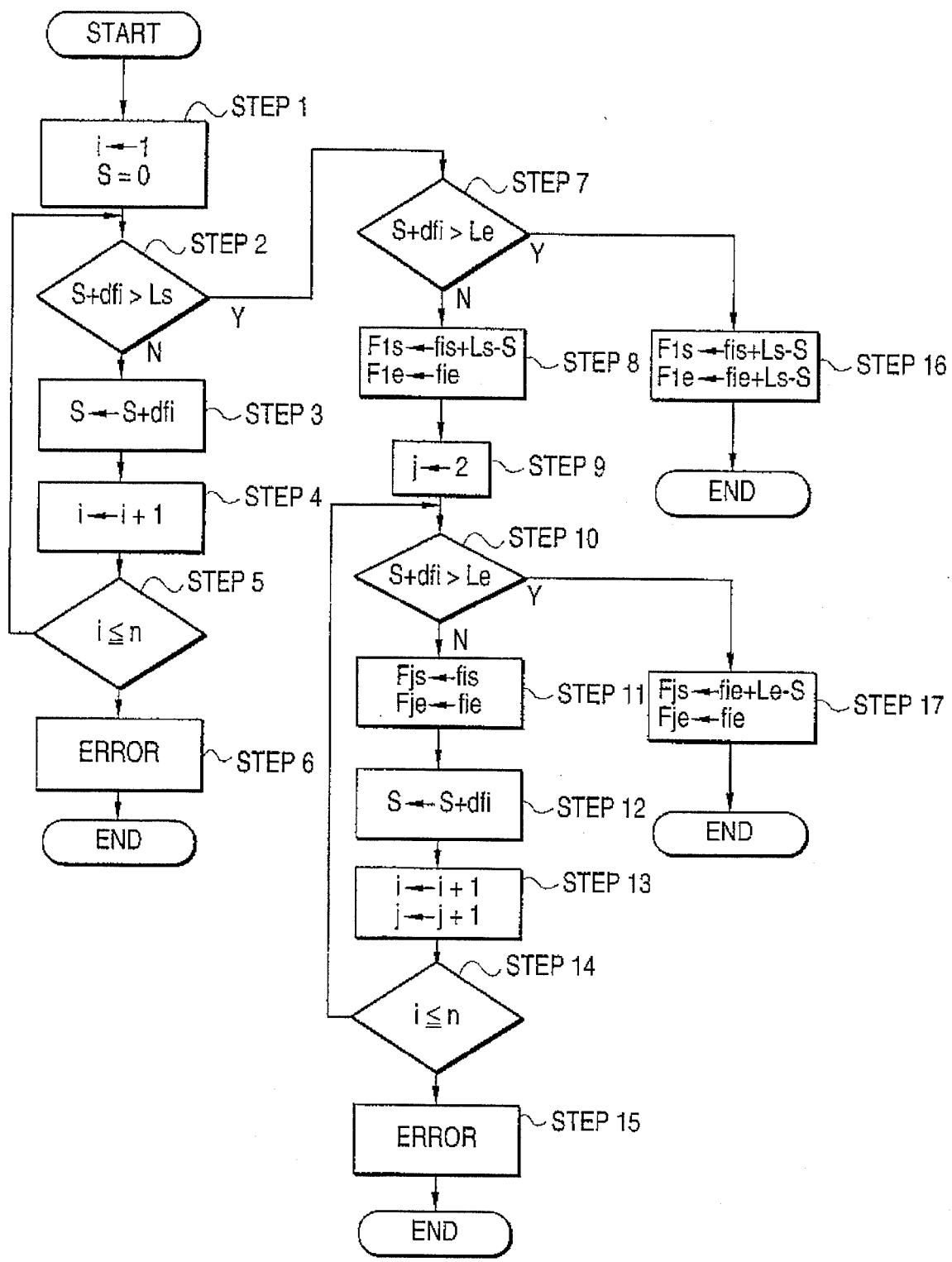
FIG. 17 is a flow chart of the processing at step 17 of FIG. 12.

FIG. 17 is a flow chart of procedures for computer execution of the steps 1 through 4 in FIG. 16. Steps 1 through 17 in FIG. 17 will be outlined below.

Steps 1 through 5 in FIG. 17 correspond to step 1 in FIG. 16. The value of S at the time S+dfi is determined to be greater than Ls at step 2 in FIG. 17 corresponds to the second term on the right-hand side of equation 3 in FIG. 16.

Step 17 in FIG. 17 corresponds to step 4 in FIG. 16. The value of S at the time S+dfi is determined to be greater than Le at step 10 in FIG. 17 corresponds to the second term on the right-hand side of equation 4 in FIG. 16. The value of i at this time corresponds to m.

Step 16 in FIG. 17 corresponds to the exceptional processing needed for the case in which the frame of LFN=Ls and that of LFN=Le are identical apart from steps 1 through 4.

(Example of calculation)

Next will be described specific processing at step 17 by way of an example of actual calculation.

Figure 18:
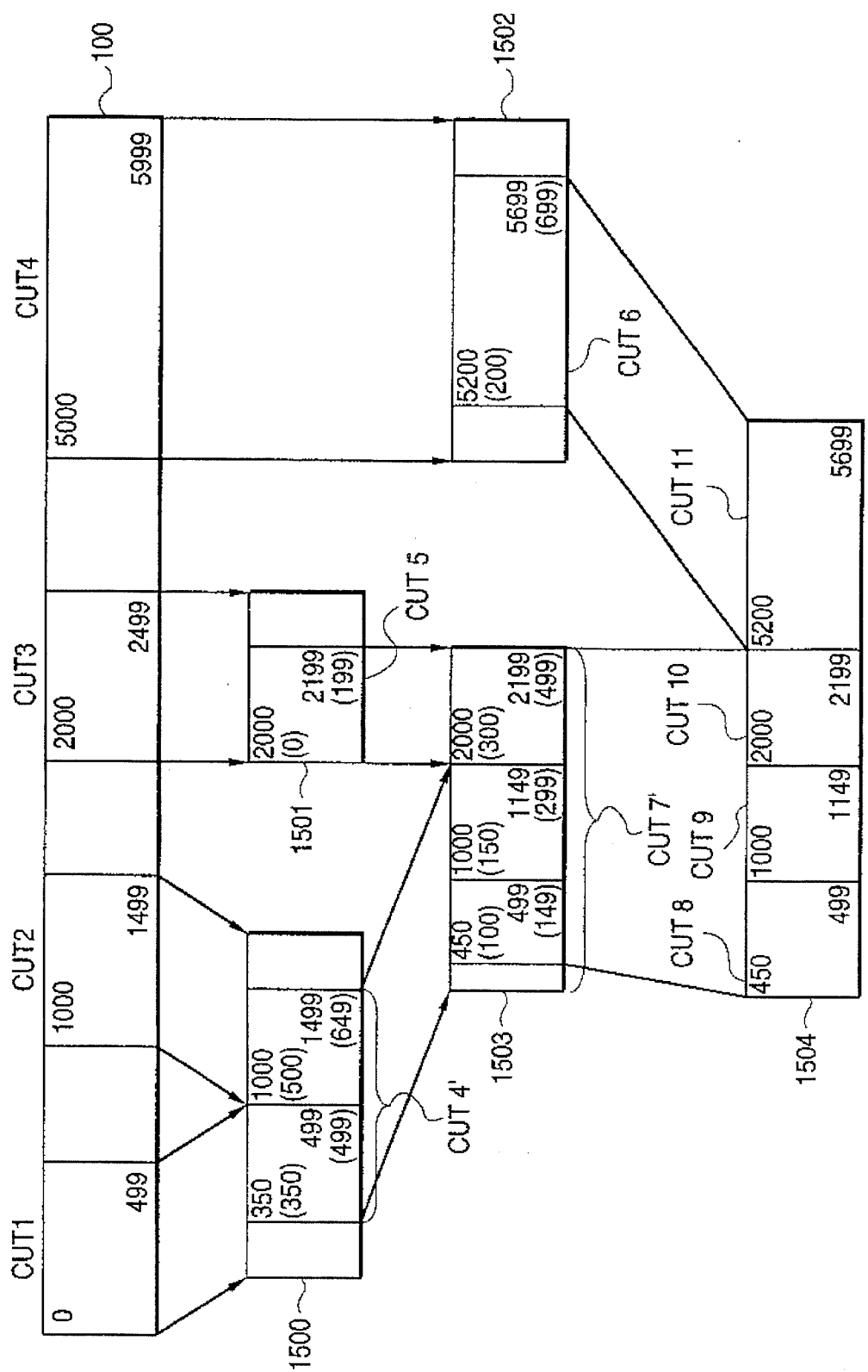
FIG. 18 is a diagram illustrating the relations among the various types of data used in the example of operation.

Referring to FIG. 18, in this example of calculation, the video data of application data 1504 are calculated.

Next will be explained the mutual relations among the various data shown in FIG. 18. In the following description, A(a–b) denotes the cut specified by absolute start frame number a and absolute end frame number b. R(a–b) denotes the cut specified by relative start frame number a and relative end frame number b.

Application data 1500 consist of cut 1=A(0–499) and cut 2=A(1000–1499). Application data 1501 consist of cut 3=A(2000–2499). Application data 1502 consist of cut 4=A(5000–5999).

Application data 1503 consist of cut 4'=R(350–649) of the application data 1500 and cut 5=R(0–199) of the application data 1501. Application data 1504 consist of cut 7=R(100–449) of the application data 1503 and cut 6=R(200–699) of the application data 1502.

Therefore, the application data 1504 consist of cut 8=A(450–499), cut 9=A(1000–1149), cut 10=A(2000–2199), and cut 11=A(5200–5699).

Figure 19:
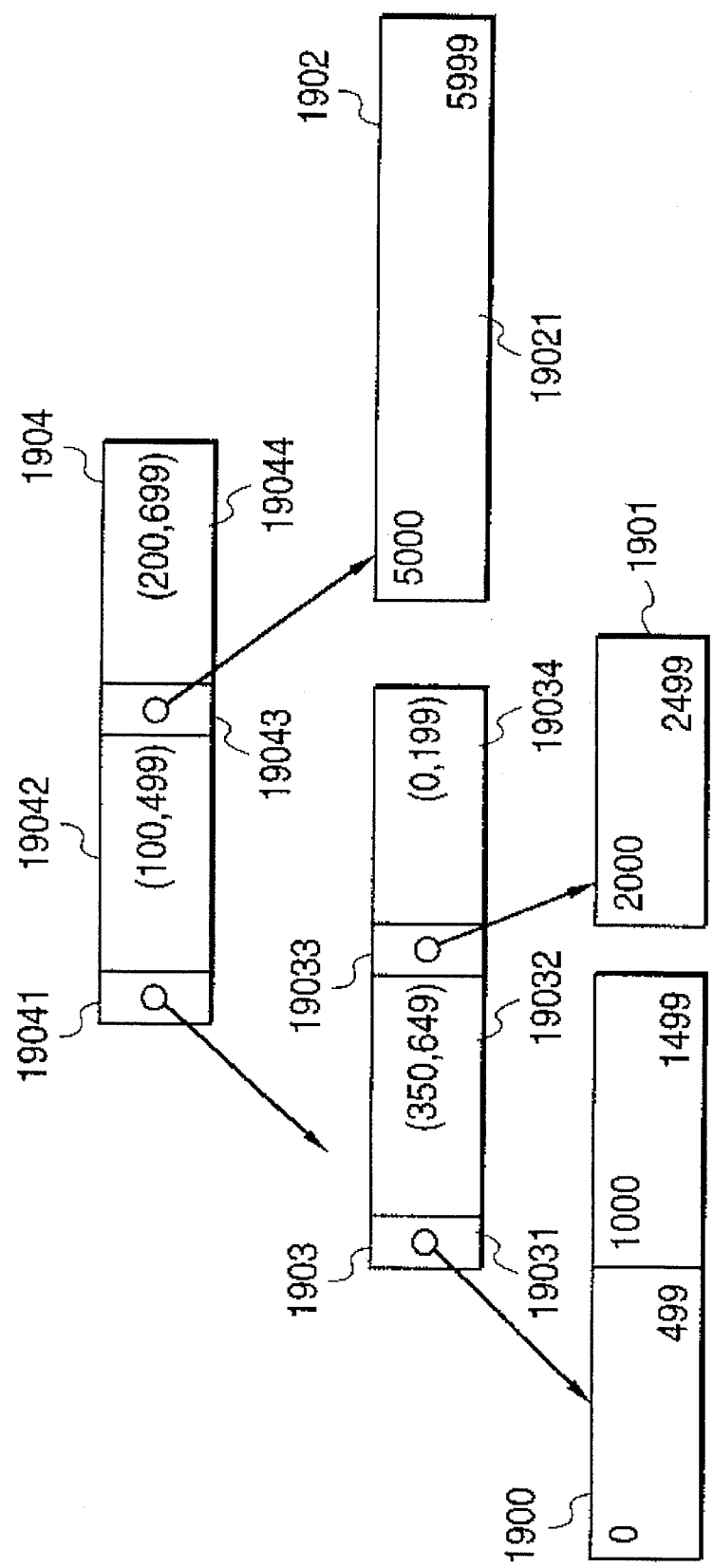
FIG. 19 is a diagram illustrating the relations among the video data 1900 through 1904.

Next will be explained the mutual relations among various video data in the situation of FIG. 19. Video data 1904 of the application data 1504 include two pairs of reference sections and constraint sections. The first reference section 19041 indicates video data 1903 of the application data 1503 as reference data. In the first constraint section is set R(100, 499) as constraint. The second reference section 19043 indicates video data 1902 of the application data 1502 as reference data. In the second constraint section is set R(200, 699) as constraint.

Video data 1903 of the application data 1503 include two pairs of reference sections and constraint sections. The first reference section 19031 indicates video data 1900 of the application data 1500 as reference data. In the first constraint section is set R(350, 649) as constraint. The second reference section 19033 indicates video data 1901 of the application data 1501 as reference data. In the second constraint section is set R(0, 199) as constraint.

The video data 1900 of the application data 1500 are index data. The video data 1900 consist of scene data= A(0–499)+A(1000–1499).

The video data 1901 of the application data 1501 are index data. The video data 1901 consist of scene data= A(2000–2499).

The video data 1902 of the application data 1502 are index data. The video data 1902 consist of scene data= A(5000–5999).

Figure 20:
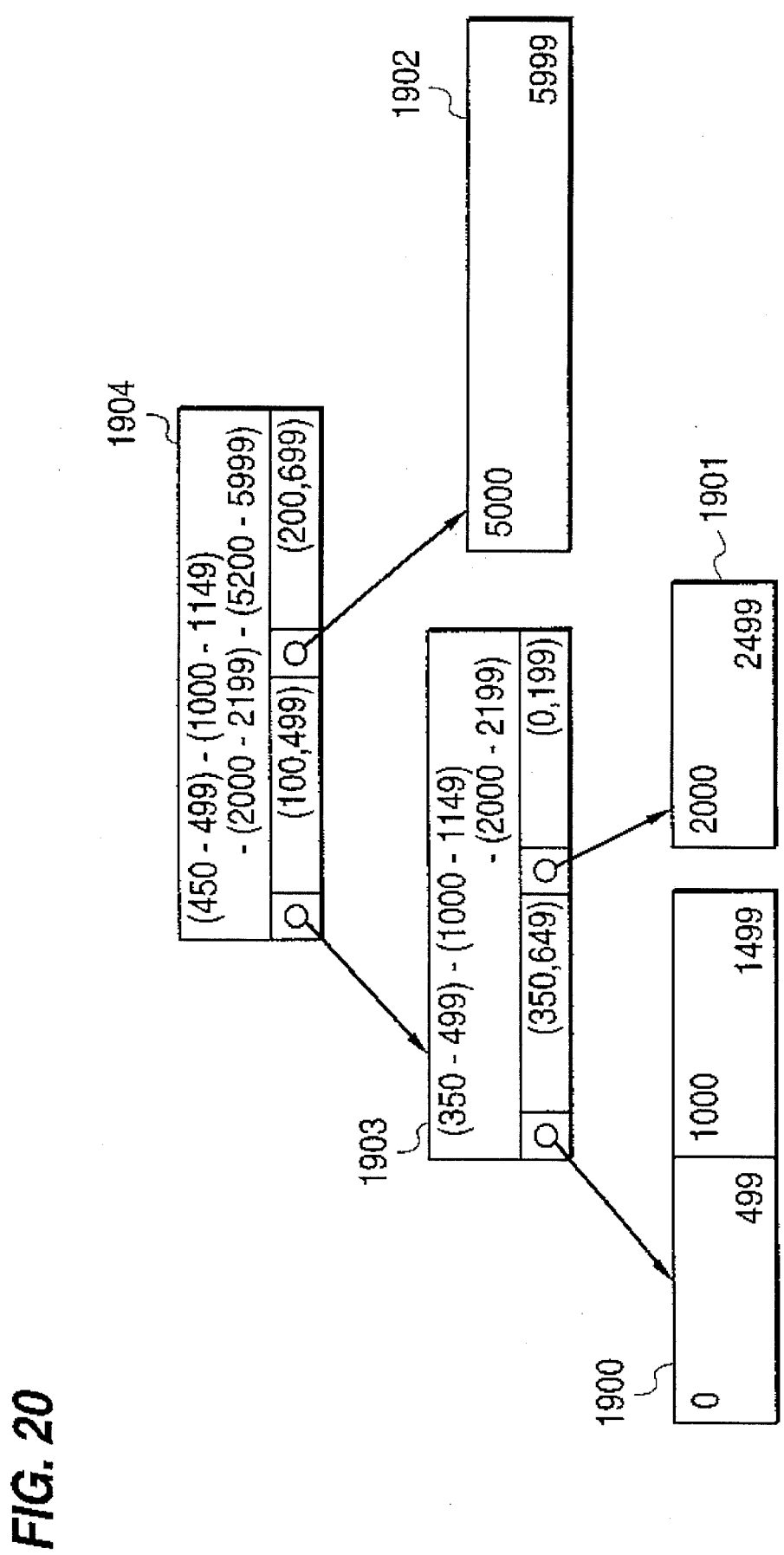
FIG. 20 is a diagram illustrating the process of operation of the processing section 3.

Next will be described the process of calculating the video data of the application data 1504. Referring to FIGS. 11 and 20, at step 1, the video data 1904 are read out of the accumulating section 1. Step 2 is followed by step 4 because the video data 1904 are virtual data. The virtual data a here are the video data 1904.

Referring now to FIG. 12, at step 11, 2 and 1 are set for the variables n and i, respectively. At step 12, the video data 1903, which are the first reference data, are read out. Step 13 is followed by step 14 because the video data 1903 are virtual data. The virtual data a here are the video data 1903.

After the execution of step 14, step 11 is executed again. The variables n and i here are represented by n' and i', respectively. At step 11, 2 and 1 are set for the variables n' and i', respectively. At step 12, the video data 1900, which are the first reference data, are read out. At step 13, the video data 1900 are determined to be index data. As a result, step 16 is executed. At step 16, the contents A(0–499)+ A(1000–1499) of the video data 1900 are written into the memory section 4.

At step 17, index data are calculated from the contents of the video data 1900 written into the memory section 4 and the first constraint R(350, 649). The index data are calculated in accordance with the process of FIG. 14 to be A(350–499)+A(1000–1149). At step 18, this calculation result is stored into the memory section 4.

At step 19, 1 is added to i'.

At step 20, n' is determined to be less than i', and step 12 is executed again. At step 12, the video data 1901, which are the second reference data of the video data 1903, are read out. At step 13, the video data 1901 are determined to be index data. As a result, step 16 is executed. At step 16, the contents A(2000–2499) of the video data 1901 are written into the memory section 4.

At step 17, index data are calculated from the contents of the video data 1901 written into the memory section 4 and the first constraint R(0, 199). The index data are calculated in accordance with the process of FIG. 14 to be A(2000–2199). At step 18, this calculation result is stored into the memory section 4.

At step 19, 1 is added to i'. At step 20, n' is determined to be less than i'. As a result, step 21 is executed. At step 21, A(350–499)+A(1000–1149)+A(2000–2199), stored into the memory section 4 at steps 11 through 20, is outputted.

Upon completion of step 21, step 15 is executed. At step 15, the output result of step 14=A(350–499)+ A(1000–1149)+A(2000–2199) is stored into the memory section 4.

Neither step 17 nor step 18 is executed. At step 19, 1 is added to i'. At step 20, n' is determined to be less than i'. As a result, step 12 is executed again.

At step 12, the video data 1902, which are the second reference data of the video data 1904, are read out. At step 13, the video data 1902 are determined to be index data. As a result, step 14 is executed. At step 16, the contents A(5000–5999) of the video data 1902 are written into the memory section 4.

At step 17, index data are calculated from the contents of the video data 1902 written into the memory section 4 and the first constraint R(200, 699). The index data are calculated in accordance with the process of FIG. 14 to be A(5200–5999). At step 18, this calculation result is stored into the memory section 4.

At step 19, 1 is added to i'. At step 20, n' is determined to be less than i'. As a result, step 21 is executed. At step 21, A(350–499)+A(1000–1149)+A(2000–2199)+ A(5200–5999), stored into the memory section 4 at steps 11 through 20, is outputted. This output result is identical with the index data of the video data 1504 shown in FIG. 15.

(Benefit of the first preferred embodiment)

As hitherto described, in this preferred embodiment, the video data of application data obtained by editing other application data are held as virtual data, and the virtual data, each set consisting of only a reference section and a constraint section, are very small in volume. Accordingly, where application data are to be edited over and over again, this embodiment can serve to reduce the volume of video data to be accumulated.

Second Preferred Embodiment

Next will be described a second preferred embodiment of the present invention. This embodiment is characteristic in that the video data indicated by the reference section of virtual data are object data of type 1. Its difference from the first embodiment consists in the procedure at step 17 in FIG. 17. The second embodiment is the same as the first in all other aspects of configuration.

Next will be described the situation to which this embodiment is applicable.

Figure 21:
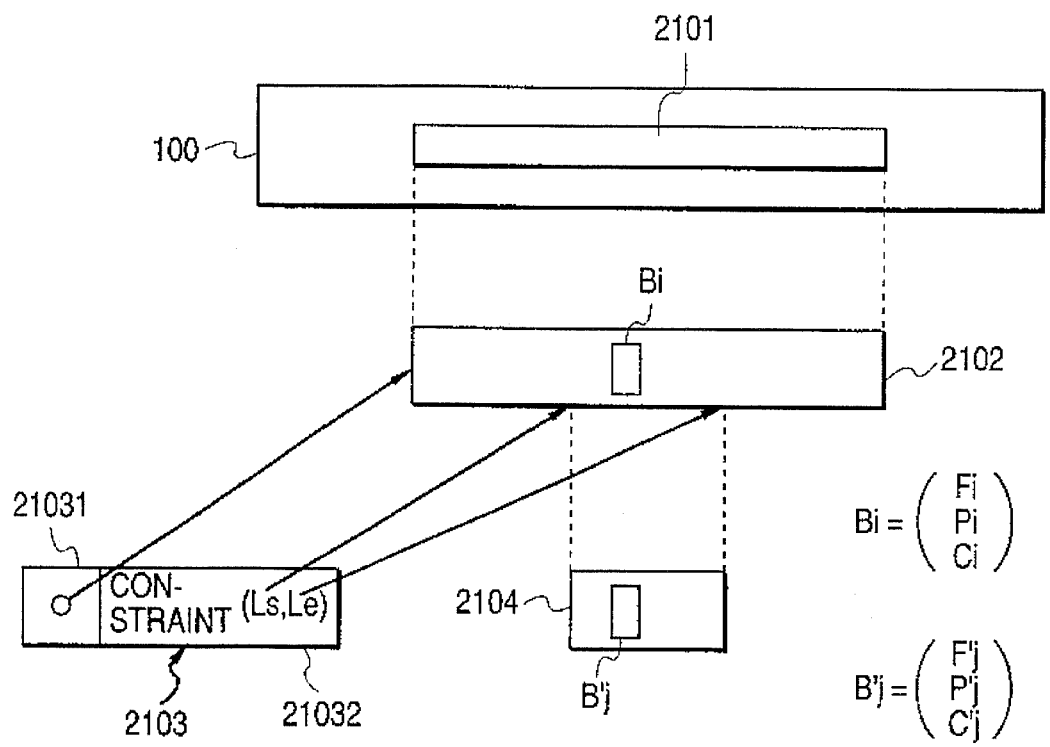
FIG. 21 is a diagram illustrating the relations among the video source 100, object data 2102, video data 2103 and object data 2104.

Referring now to FIG. 21, an object appears in the frame represented by 2101 of the video source 100. Object data 2102 of type 1 for this object are given. The object data 2102 consist of data Bi. The data Bi consist of an absolute frame number Fi, the object's position Pi and the object's configuration Ci.

Object data 2104 are obtained by processing the object data 2102 in accordance with virtual data 2103. To the reference section 21031 of the virtual data 2103 are indicated the object data 2102. In the constraint section 21032 of the virtual data 2103 is set R(Ls, Le). Ls and Le are relative frame numbers in the object data 2102. Thus, the data of frames from the start frame number Ls through the end frame number Le in the object data 2102 constitute the object data 2104. The object data 2104 consist of data B'j. The data B'j consist of an absolute frame number F'j, the object's position P'j and the object's configuration C'j.

Figure 22:
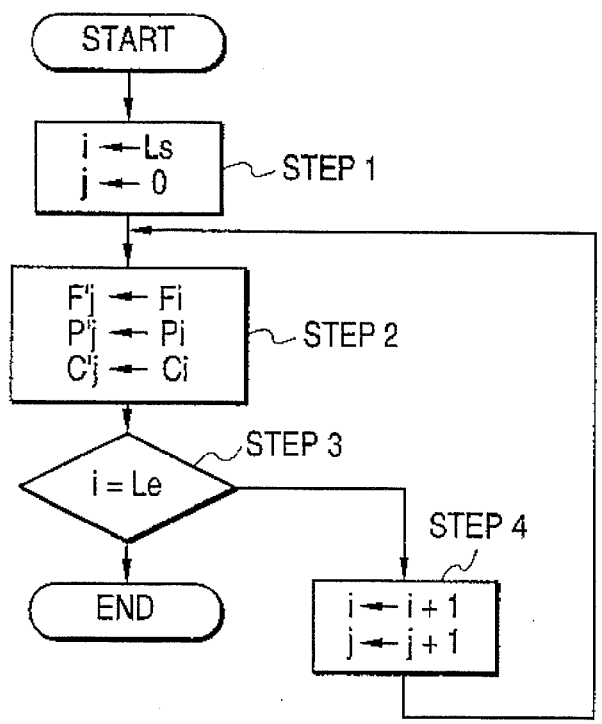
FIG. 22 is a flow chart of the processing at step 17 of FIG. 12.

Referring to FIG. 22, step 17 of the second embodiment can be realized by steps 1 through 4 in FIG. 22. At step 1, Ls and 0 are set for i and j, respectively. At step 2, Fj, Pj and Cj are set for F'j, P'j and C'j, respectively. At step 3, it is determined whether or not i is equal to Le. If i is determined not to be equal to Le as a result, step 4 is executed. At step 4, 1 is added to i and j. Upon completion of step 4, step 2 is executed again.

If i is determined to be equal to Le at step 3, the processing is completed.

By executing these steps 1 through 4, the object data 2104 can be configured from the object data 2102 and the virtual data 2103.

(Benefit of the second preferred embodiment)

As described above, in the second preferred embodiment too, video data obtained by modifying other video data are held as virtual data, with the result that the volume of video data to be accumulated can be reduced.

(Third Preferred Embodiment)

Next will be described a third preferred embodiment of the present invention. This embodiment is characteristic in that the video data indicated by the reference section of virtual data are object data of type 2. Its difference from the first embodiment consists in the procedure at step 17 in FIG. 17. The third embodiment is the same as the first in all other aspects of configuration.

Next will be described the situation to which this embodiment is applicable.

Figure 23:
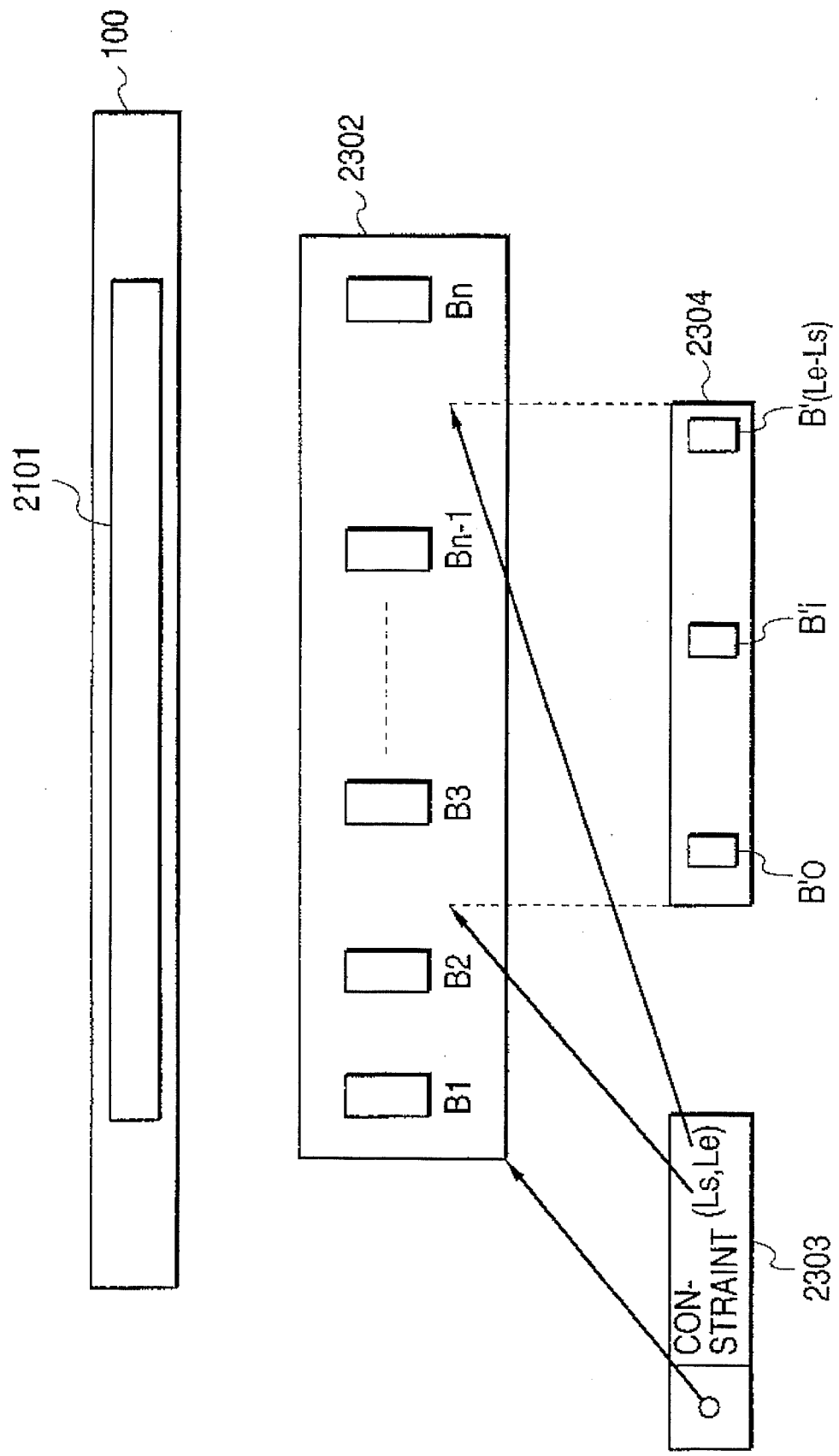
FIG. 23 is a diagram illustrating the relations among the video source 100, object data 2102, video data 2103 and object data 2104.

Referring now to FIG. 23, an object appears in the frame represented by 2101 of the video source 100. Object data 2302 of type 2 are given for this object. The object data 2302, since they are object data of type 2, consist of data Bi. The data Bi consist of an absolute frame number Fi, the object's position Pi and the object's configuration Ci. The data Bi they constitute are given in a scattered way.

Object data 2304 of type 1 are obtained by processing the object data 2302 in accordance with virtual data 2303. To the reference section 23031 of the virtual data 2303 are indicated the object data 2302. In the constraint section 23032 of the virtual data 2303 is set A(Ls, Le). Ls and Le are absolute frame numbers. Thus, the data of frames from the start frame number Ls through the end frame number Le in the object data 2302 constitute the object data 2304. The object data 2302 consist of data B'0 through B' (Ls - Le). The data B'j consist of an absolute frame number F'j, the object's position P'j and the object's configuration C'j.

The above-described framework resembles that of the second preferred embodiment. However, since the object data 2302 are object data of type 2 and the constraint is given in an absolute frame number, there arises a problem that is not encountered in the second embodiment. That is, data Bi corresponding to the frame numbers Ls and Le indicated by the constraint do not necessarily exist. In the case of FIG. 23, no data Bi for which the frame number Ls is Fi exist. Therefore, data Bi in a frame close to the frame number Ls should be selected. In the case of FIG. 23, data B2 are selected. Similarly, corresponding to Le, data Bn are selected, and the contents of data B2 through Bn are calculated by interpolation to give the object data 2304.

Figure 24:
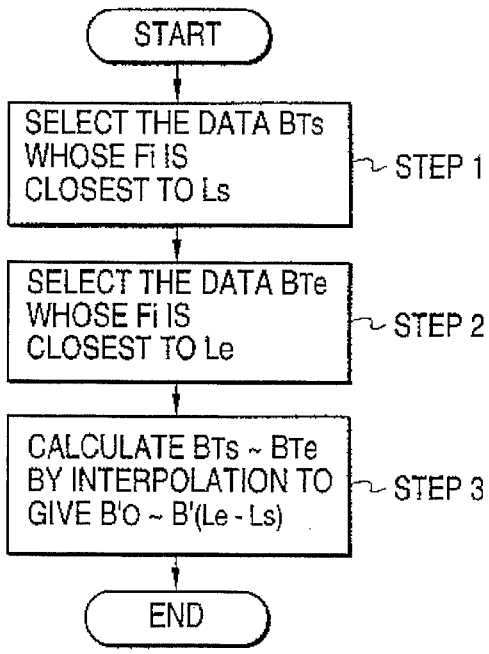
FIG. 24 is a flow chart of the processing at step 17 of FIG. 12.

In the case of the third embodiment, step 17 of FIG. 12 can be realized by steps 1 through 3 in FIG. 24. At step 1, data Bi whose Fi is the closest to Ls are selected. This set of data Bi is represented by BTs. At step 2, data Bi whose Fi is the closest to Le are selected. This set of data Bi is represented by BTe. At step 3, the contents of data BTs through BTe are calculated by interpolation to give B'0 through B'(Le-Ls).

Figure 25:
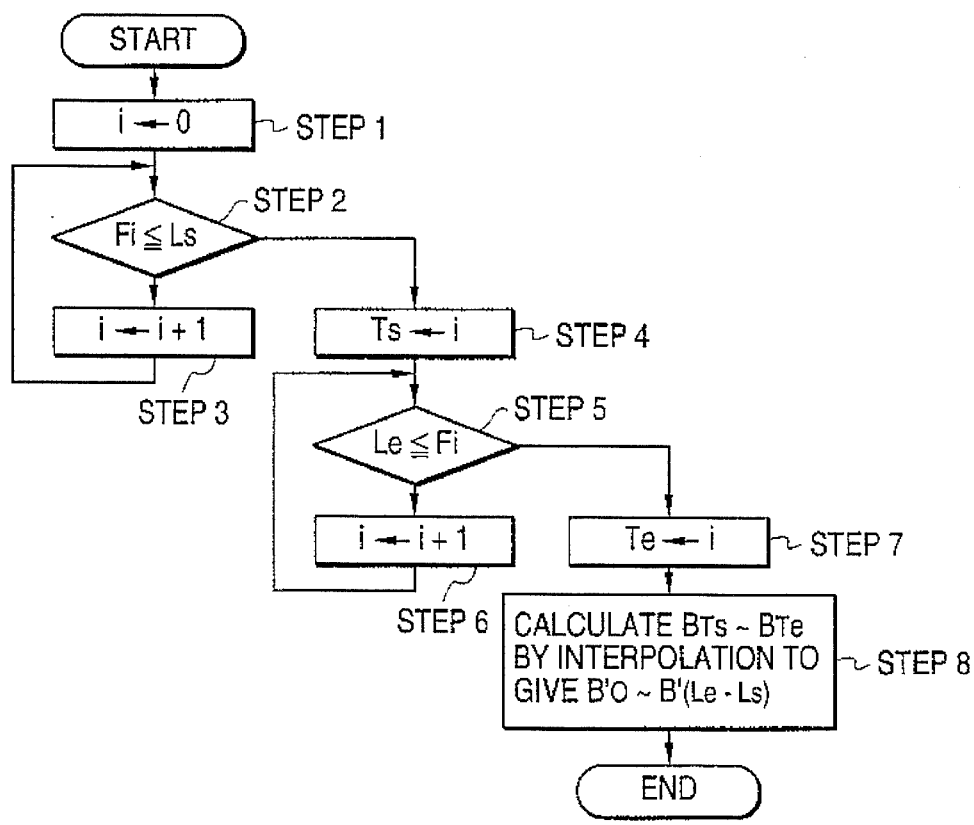
FIG. 25 is a flow chart showing the details of the operation of FIG. 24.

Referring to FIG. 25, steps 1 through 3 of FIG. 24 can be realized by steps 1 through 8 of FIG. 25. Steps 1 through 4 of FIG. 25 correspond to step 1 of FIG. 24. Steps 5 through 7 of FIG. 25 correspond to step 2 of FIG. 24. Step 8 of FIG. 25 corresponds to step 3 of FIG. 24.

(Benefit of the third preferred embodiment)

As described above, in the third preferred embodiment too, video data obtained by modifying other video data are held as virtual data, with the result that the volume of video data to be accumulated can be reduced.

As hitherto described, the essence of the present invention consists in the introduction of virtual data, which are a new type of data, and in the holding of video data available by modifying other video data in the form of virtual data. The invention may be embodied in various other specific forms within the scope of the summary. Especially, there is no limitation as to the type of data to be indicated by the reference and constraint sections of virtual data. The scope of the invention is indicated by the appended claims, but not restricted in any way by the main text of the specification. Furthermore, all modifications and changes which come within the range of equivalency of the claims are intended to be embraced therein.

What is claimed is:

1. A video data management method, where virtual data having a reference section for indicating the data to be referred to and a constraint section indicating the manner in which the reference data are to be processed are held as video data, comprising:

a first step to read out designated video data;

a second step to obtain index data, when the video data read out are virtual data, by processing said reference data as indicated by said constraint section; and a third step to supply said index data as video data.

2. A video data management method, as claimed in claim 1, wherein:

said reference data indicated by said reference section of said virtual data are scene data of a plurality of cuts;

said constraint indicated by said constraint section of said virtual data is a pair of a start frame number and an end frame number;

said index data are scene data of first through Fth cuts; and said second step includes:

a fifth step to specify a start cut including the frame of said start frame number;

a sixth step to specify an end cut including the frame of said end frame number; and a seventh step to calculate the scene data of said first through Fth cuts of scene data on the basis of the scene data of the cuts from said start cut through said end cut.

3. A video data management method, as claimed in claim 1, wherein:

said reference data indicated by said reference section of said virtual data are object data of type 1 which specifies a position and a configuration of at least one object in every frame of a video signal;

said constraint indicated by said constraint section of said virtual data is a pair of a start frame number and an end frame number;

said index data are object data of type 1; and said second step includes a fifth step to take out data between said start frame number and said end frame number among said reference data.

4. A video data management method, as claimed in claim 1, wherein:

said reference data indicated by said reference section of said virtual data are object data of type 2 which specifies a position and a configuration of at least one object in every plurality of frames of a video signal;

said reference data include data Bi;

the data Bi include at least either the object's position Pi or the object's configuration Ci, and a frame number Fi;

said constraint indicated by said constraint section of said virtual data is a pair of a start frame number and an end frame number;

said index data are object data of type 1 which specifies a position and a configuration of at least one object in each of successive frames of a video signal; and said second step includes:

a fifth step to specify, out of said data Bi, data BTs whose Fi is close to said start frame number;

a sixth step to specify, out of said data Bi, data BTe whose Fi is close to said end frame number; and a seventh step to calculate the data from said data BTs through said data BTe by interpolation to give said index data.

5. A video data management apparatus comprising:

an accumulating section for accumulating video data;

read means for reading out first video data from said accumulating section;

decision means for deciding whether or not said first video data read out by said read means are virtual data, and supplying said first video data when said first video data are not virtual data; and calculating means, actuated when said first video data are determined by said decision means not to be virtual data, for reading out reference data indicated by the reference section of said first video data from said accumulating section, calculating index data by processing said reference data under constraints indicated by the constraint section of said first video data and supplying said index data as video data.

* * * * *